United States Patent
McGowan

(10) Patent No.: US 8,392,559 B2
(45) Date of Patent: Mar. 5, 2013

(54) MULTIPLE PHASE DISTRIBUTED REDUCTION

(75) Inventor: Albert J. McGowan, Phoenix, AZ (US)

(73) Assignee: Unicorn Media, Inc., Tempe, AZ (US)

( * ) Notice: Subject to any disclaimer, the term of this patent is extended or adjusted under 35 U.S.C. 154(b) by 0 days.

(21) Appl. No.: 13/364,086

(22) Filed: Feb. 1, 2012

(65) Prior Publication Data

US 2012/0246298 A1    Sep. 27, 2012

(30) Foreign Application Priority Data

Mar. 25, 2011    (AU) .............................. 2011201381

(51) Int. Cl.
*G06F 15/173*    (2006.01)
(52) U.S. Cl. ........ 709/224; 709/223; 709/229; 370/227; 703/21; 725/46
(58) Field of Classification Search ........... 709/223–224
See application file for complete search history.

(56) References Cited

U.S. PATENT DOCUMENTS

| 2002/0184043 A1 | 12/2002 | Lavorgna et al. |
| 2006/0149848 A1* | 7/2006 | Shay .............................. 709/229 |
| 2007/0282920 A1* | 12/2007 | Egi et al. ....................... 707/201 |
| 2008/0263029 A1 | 10/2008 | Guha et al. |

* cited by examiner

*Primary Examiner* — Hua Fan
(74) *Attorney, Agent, or Firm* — Kilpatrick Townsend & Stockton LLP

(57) ABSTRACT

A method and system for metric information processing is disclosed in one embodiment. Metric information is gathered with a plurality of points of presence (POPs) geographically distributed across the Internet. The metric information is processed in a hub-and-spoke fashion with a metric reduction occurring in the POPs and another metric reduction in a kernel application server according to predetermined schemes. The two-stage metric reduction generates a result set including a data structure. The result set can be processed according to a query to generate a report. The data structure and reports have metric information that is recent and updated regularly without use of a database.

14 Claims, 11 Drawing Sheets

US 8,392,559 B2

MULTIPLE PHASE DISTRIBUTED REDUCTION

This application is related by priority to: Australian Patent No. 2011201381 issued Jan. 12, 2012, entitled "MULTIPLE PHASE DISTRIBUTED REDUCTION ANALYTICS PERFORMANCE ENHANCEMENTS;" which is hereby incorporated by reference in its entirety for all purposes.

BACKGROUND

This disclosure relates in general to network analytics and, but not by way of limitation, to processing network analytics data.

Content and applications are delivered with the Internet. For example, web pages are delivered to end users with embedded scripts and/or applets. Content providers deliver their content using a variety of hosting services, content delivery networks (CDNs) and their own origin servers. Paramount to providing a desired experience to end users, content providers wish to track analytics that reflect how the content and applications are being delivered.

Delivery patterns and performance are of interest so that content providers can monitor usage and quality of service (QoS). For example, a content provider might modify a web page and wish to see if end users react favorably to the modified web page. Gathering analytics is provided by web performance services who maintain large databases. These services generate reports periodically by querying the large databases, but not close to real time. Queries to the gathered analytics can be performed, but takes 4-6 hours to generate a report as the databases are so large.

Solid state drives (SSDs) and flash memory is becoming more common as a spinning disk replacement for non-volatile storage. Seek times for SSD, flash memory and RAM are considerably faster than for spinning media. Conventional metric gathering has used spinning media with the algorithms and architectures that best leverage spinning media with its large seek times. There are SSDs that have interfaces similar to hard drives (i.e., SATA, PATA, SCSI or SAS) or computer bus interfaces (e.g., miniPCI or PCIe). Flash memory is sometimes integrated into a hardware server without using an expansion bus or interface, for example, through placement on the motherboard or a dual in-line memory module (DIMM) connector. Random access memory (RAM) is common in hardware servers, but often is a limited resource.

Computer architectures interface with volatile memory in different ways. There are tradeoffs between the different data structures commonly used by operating systems and/or processors when allocating memory. A heap data structure is very flexible in accommodating different data types, but is relatively slow. A stack data structure adds or removes data in a last-in-first-out manner only accommodating integer data types, but is typically far faster than heap allocation. Databases tend to be slow because they rely on heap data structures.

As mentioned above, the heap is substantially slower than use of the stack. Databases extensively use the heap relying on reference types. For large datasets, database queries can take hours to fulfill. Additionally, distributed databases are difficult to reconcile to maintain coherency. Periodic updates with distributed database require processing resources and bandwidth. Metric processing operates on huge datasets and the databases are slow to query.

SUMMARY

In one embodiment, the present disclosure provides a method and/or system for metric information processing. Metric information is gathered with a plurality of points of presence (POPs) geographically distributed across the Internet. The metric information is processed in a distributed fashion with a metric reduction occurring in the POPs and another metric reduction in a kernel application server according to predetermined schemes. The two-stage metric reduction generates a result set including a data structure. The result set can be processed according to a query to generate a report. The data structure and reports have metric information that is recent and updated regularly without use of a database.

In one embodiment, the present disclosure provides an Internet metric processing system for processing web performance metrics in a distributed fashion, the Internet metric processing system comprising a first point of presence (POP), a second POP and a central location. The first POP including one or more servers programmed to: receive a first metric message, including first performance information, which relates to content delivery with a first end user computing device; receive a second metric message, including second performance information, which relates to content delivery with the first end user computing device; combine the first performance information and the second performance information into a first record, which summarizes the first performance information and second performance information according to a first scheme; and store the first record at the first POP. The second POP including one or more servers programmed to: receive a third metric message, including third performance information, which relates to content delivery with a second end user computing device; receive a fourth metric message including fourth performance information, which relates to content delivery with the second end user computing device; combine the third performance information and the fourth performance information into a second record, which summarizes the third performance information and fourth performance information according to a first scheme; and store the second record at the second POP. The central location is coupled to the first POP and the second POP and includes one or more servers programmed to: receive the first record from the first POP; receive the second record from the second POP; combine the first record and the second record into a result set; store the result set comprising a plurality of records including the first record and the second record, the result set being a data structure held in a file; receive a query for a report after the combining of the result set; load the file holding the result set; process the result set to create the report that is a subset of the result set; and send the report in response to the query.

In one embodiment, the present disclosure provides a method for processing web performance metrics in a distributed fashion. A first metric message is received, including first performance information with a first point of presence (POP), wherein the first performance information relates to content delivery with a first end user computing device. A second metric message is received, including second performance information with the first POP, wherein the second performance information relates to content delivery with the first end user computing device. The first performance information and the second performance information are combined into a first record, which summarizes the first performance information and second performance information according to a first scheme. The first record is stored at the first POP. The first record is sent to a location away from the first POP. A third metric message is received, including third performance information at a second POP, wherein the third performance information relates to content delivery with a second end user computing device. A fourth metric message is received, including fourth performance information at the second POP, wherein the fourth performance information relates to content delivery with the second end user computing device. The third performance information and the fourth performance information are combined into a second record, which summarizes the third performance information and fourth performance information according to a first scheme. The second record is stored at the second POP. The first record is sent to the location away from at least one of the first POP or the second POP. The first record and the second record are combined at the location into a result set. The result set comprising a plurality of records including the first record and the second record is stored in a data structure held in a file. A query for a report is received after the combining of the result set. The file holding the result set is loaded. The result set is processed to create the report that is a subset of the result set. The report is sent in response to the query.

In one embodiment, the present disclosure provides an Internet metric processing system for processing web performance metrics in a distributed fashion. The Internet metric processing system comprising a plurality of hardware servers programmed to perform the functions described in this paragraph. A first metric message is received, including first performance information with a first point of presence (POP), wherein the first performance information relates to content delivery with a first end user computing device. A second metric message is received, including second performance information with the first POP, wherein the second performance information relates to content delivery with the first end user computing device. The first performance information and the second performance information are combined into a first record, which summarizes the first performance information and second performance information according to a first scheme. The first record is stored at the first POP. The first record is sent to a location away from the first POP. A third metric message is received, including third performance information at a second POP, wherein the third performance information relates to content delivery with a second end user computing device. A fourth metric message is received, including fourth performance information at the second POP, wherein the fourth performance information relates to content delivery with the second end user computing device. The third performance information and the fourth performance information are combined into a second record, which summarizes the third performance information and fourth performance information according to a first scheme. The second record is stored at the second POP. The first record is sent to the location away from at least one of the first POP or the second POP. The first record and the second record are combined at the location into a result set. The result set comprising a plurality of records including the first record and the second record is stored in a data structure held in a file. A query for a report is received after the combining of the result set. The file holding the result set is loaded. The result set is processed to create the report that is a subset of the result set. The report is sent in response to the query.

Further areas of applicability of the present disclosure will become apparent from the detailed description provided hereinafter. It should be understood that the detailed description and specific examples, while indicating various embodiments, are intended for purposes of illustration only and are not intended to necessarily limit the scope of the disclosure.

BRIEF DESCRIPTION OF THE DRAWINGS

The present disclosure is described in conjunction with the appended figures.

In the appended figures, similar components and/or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

The ensuing description provides preferred exemplary embodiment(s) only, and is not intended to limit the scope, applicability or configuration of the disclosure. Rather, the ensuing description of the preferred exemplary embodiment(s) will provide those skilled in the art with an enabling description for implementing a preferred exemplary embodiment. It is understood that various changes may be made in the function and arrangement of elements without departing from the spirit and scope as set forth in the appended claims.

Figure 1:
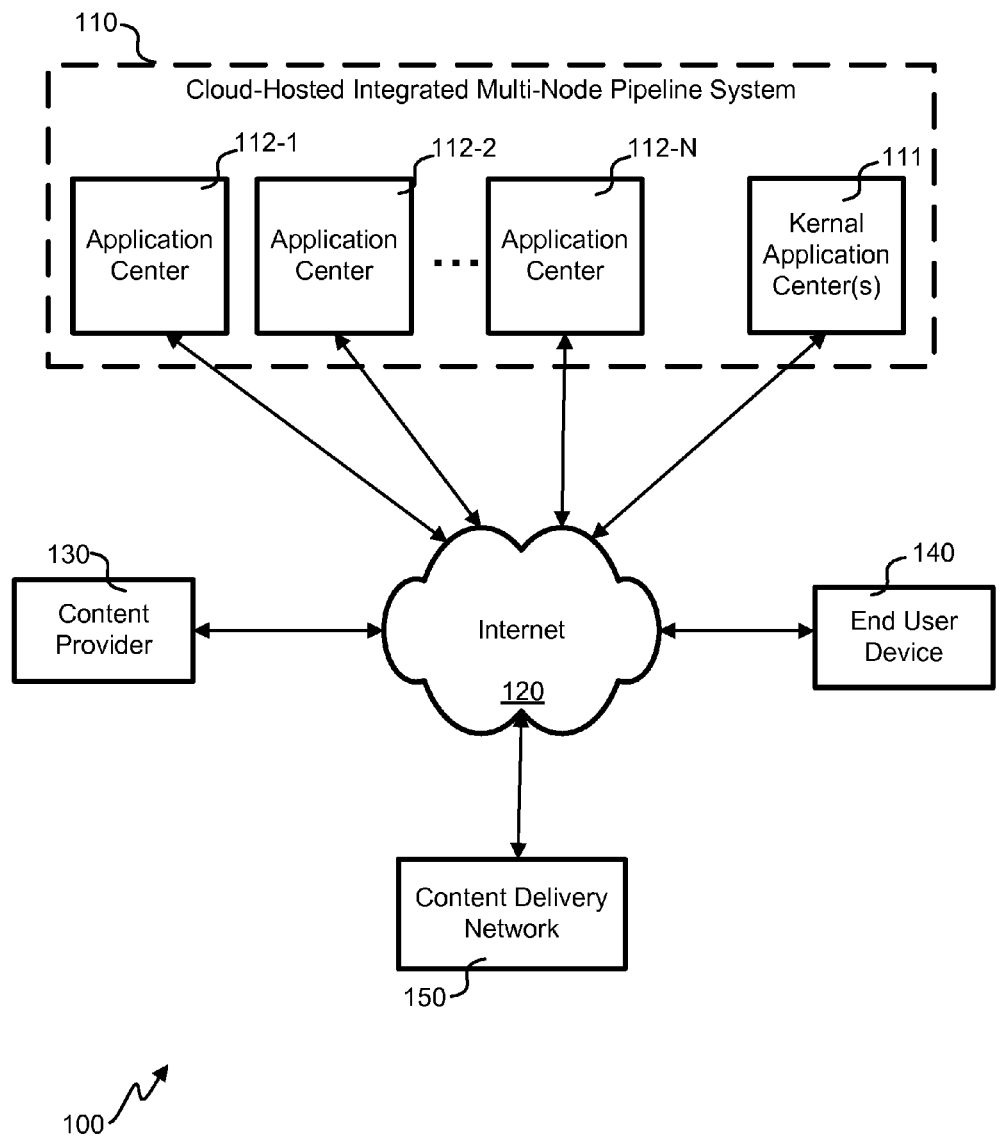
FIG. 1 depicts a block diagram of an embodiment of a media servicing system.

Referring first to FIG. 1, a block diagram illustrating an embodiment of a media servicing system 100 is shown. The media servicing system 100 delivers media content to the end user device 140 through a network such as the Internet 120. The end user device 140 can be one of any number of devices configured to receive media over the Internet 120, such as a mobile phone, tablet computer, a personal computer, a portable media device, a set top box, or any other device that renders media content. A media asset provided by a content provider 130 is processed and indexed by cloud-hosted integrated multi-node pipelining system (CHIMPS) 110 and further stored on content delivery network (CDN) 150. Additionally or alternatively, the CHIMPS 110 can store the media asset as a host and/or cache.

The media servicing system 100 enables CHIMPS 110, a content provider 130 or other entity to gather information or metrics regarding user behavior during media playback or interaction with content. For example, a content provider 130 can be provided with data indicating that end users tend to stop watching a video at a certain point in playback or that users tended to follow links associated with certain advertisements displayed during playback. Other information such as visits to a web page, domain or channel within a domain can be tracked by the media servicing system 100. With this metrics data, a content provider 130 can adjust factors such as media content, advertisement placement and content, etc. to increase usage and/or revenue associated with the media content and/or provide the end user device 140 with a more desirable playback or content experience.

End user device 140 can request a media asset to stream or download with a client program executed by the end user device 140. The client program can be, for example, a media player, browser, or other application adapted to request and/or play media assets. In response to a request for a media asset, the CHIMPS 110 can utilize any number of application centers 112 and/or kernel application center(s) 111 to provide the client program with a data object concerning the requested media asset. Interaction with media assets within CHIMPS 110 can generate metric data as well as the client program reporting metric data when rendering a media asset. The application centers 112 are spread throughout the Internet 120 as points of presence (POPs). End user devices 140 typically find the closest application center 112 in network terms or the application center 112 best suited to service the media asset delivery using domain name service (DNS) routing, URL redirects and/or the Anycast protocol.

The data object can include information about the media asset, including where the media asset can be located, such as within the CDN 150 or within the CHIMPS 110 itself Location information may be provided by Universal Resource Indicator (URI), a Universal Resource Locator (URL) or other indicator. During playback of the media asset, the CHIMPS 110 can collect metric data regarding the playback or interaction through beaconing messages provided by a client program executed by the end user device 140 and/or indexing service from within the CHIMPS 110 and/or CDN 150. The CHIMPS 110 can subsequently provide the data and/or any analytics information derived from the data to the content provider 130 in an aggregated report or by custom query.

Figure 2A:
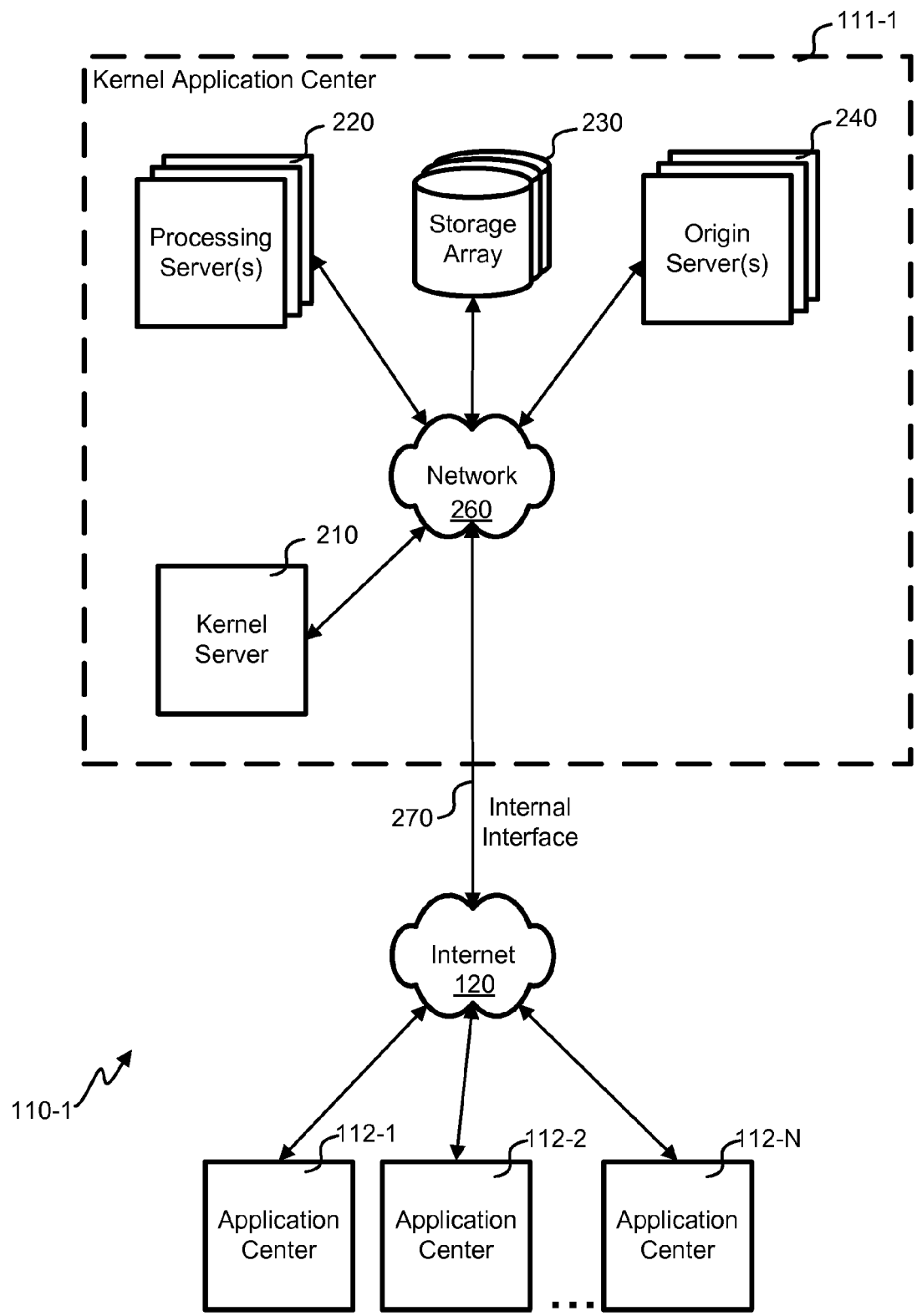
FIGS. 2A and 2B depict block diagrams of embodiments of a kernel application center.

With reference to FIG. 2A, a block diagram illustrating an embodiment of a kernel application center 111-1 connected with application centers 112 from within the CHIMPS 110-1 is shown. The kernel application center 111-1 and application centers 112 can be geographically distant and connected via the Internet 120, wide area network (WAN), and/or other data communication network. Because application centers are geographically separated, DNS services (not shown), redirection techniques and/or Anycast can be used to allow an end user device 140 to connect to the nearest (in network terms) available application center 112. The kernel application center 111-1 can connect with application centers 112 within the CHIMPS 110-1 through an internal interface 270 passing through the Internet 120, thereby enabling the application centers 112 access to the various components within the kernel application center 111-1. The internal interface 270 could use a leased connection that does not mix with the Internet 120 in other embodiments.

Components within the kernel application center 111-1 can communicate through network 260 such as a local area network (LAN). The kernel application center 111-1 includes one or more origin servers 240, one or more processing servers 220, one or more kernel servers 210, and a storage array 230. Data objects and/or media assets are stored in and distributed from the storage array. The storage array 230 may also be utilized by services running on processing server(s) 220 that use temporary or long-term storage. For example, the storage array can cache or store metric reports and result sets. Kernel server 210 can utilize processing server(s) 220 to provide various functional capabilities to the CHIMPS 110. The processing servers 220 may be used to perform any number of tasks and repurposed as desired, for example, a processing server may perform metric processing to aggregate results and reports.

The CHIMPS 110-1 can provide transcoding service for media assets provided by a content provider 130 for syndication. Such a service can allow a content provider 130 to upload a media asset to an application center 112, after which the application center 112 would notify the kernel server 210 that the media asset has been uploaded. The kernel server 210 can then notify services running on the processing server(s) 220 of the upload. These services can utilize transcoding software on the processing server(s) 220 to transcode the media asset, which can then be moved to a CDN 150 and/or stored locally by the origin server(s) 240. Services running on the processing server(s) 220 can also update the associated data object stored by the storage array 230 and origin server(s) 240.

Figure 2B:
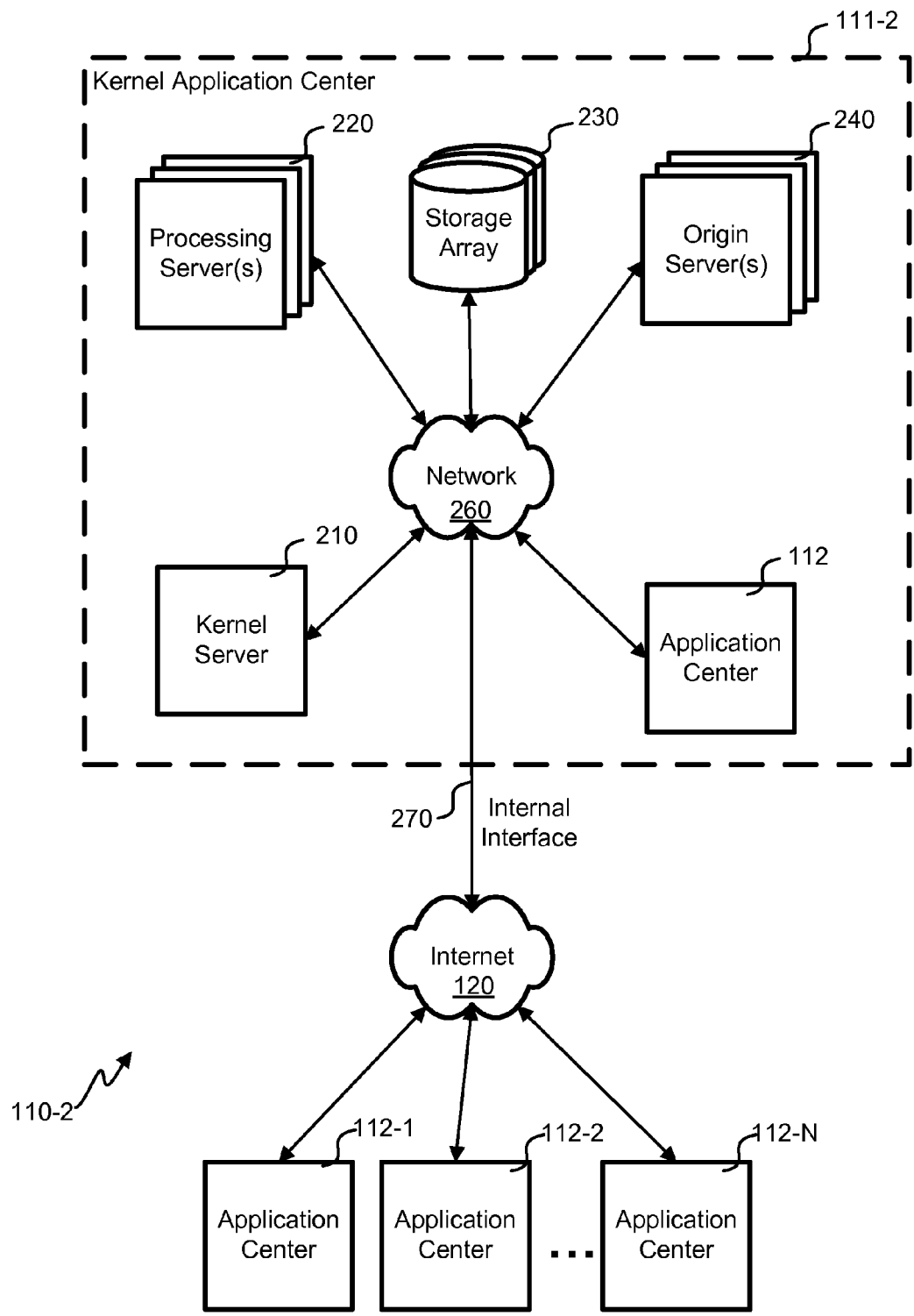

Referring next to FIG. 2B, a block diagram illustrating an alternative embodiment of a kernel application center 111-2 is shown. In addition to the components of the embodiment of FIG. 2A, this embodiment incorporates an application center 112 within the kernel application center 111-2. The application center 112 incorporated within kernel application center 111-2 may be located at or near the other components of the kernel application center 111-2, and can be communicatively connected to the other components via network 260. The incorporated application center 112 can therefore have faster access to kernel application center functionality because communication over long distances is not needed.

Other embodiments of CHIMPS 110 can include multiple kernel application centers 111 with one or more application centers 112 incorporated therein. Additionally or alternatively, components of the kernel application center 111 may be incorporated into one or more application centers 112 in the CHIMPS 110 or distributed among several application centers 112.

Figure 3:
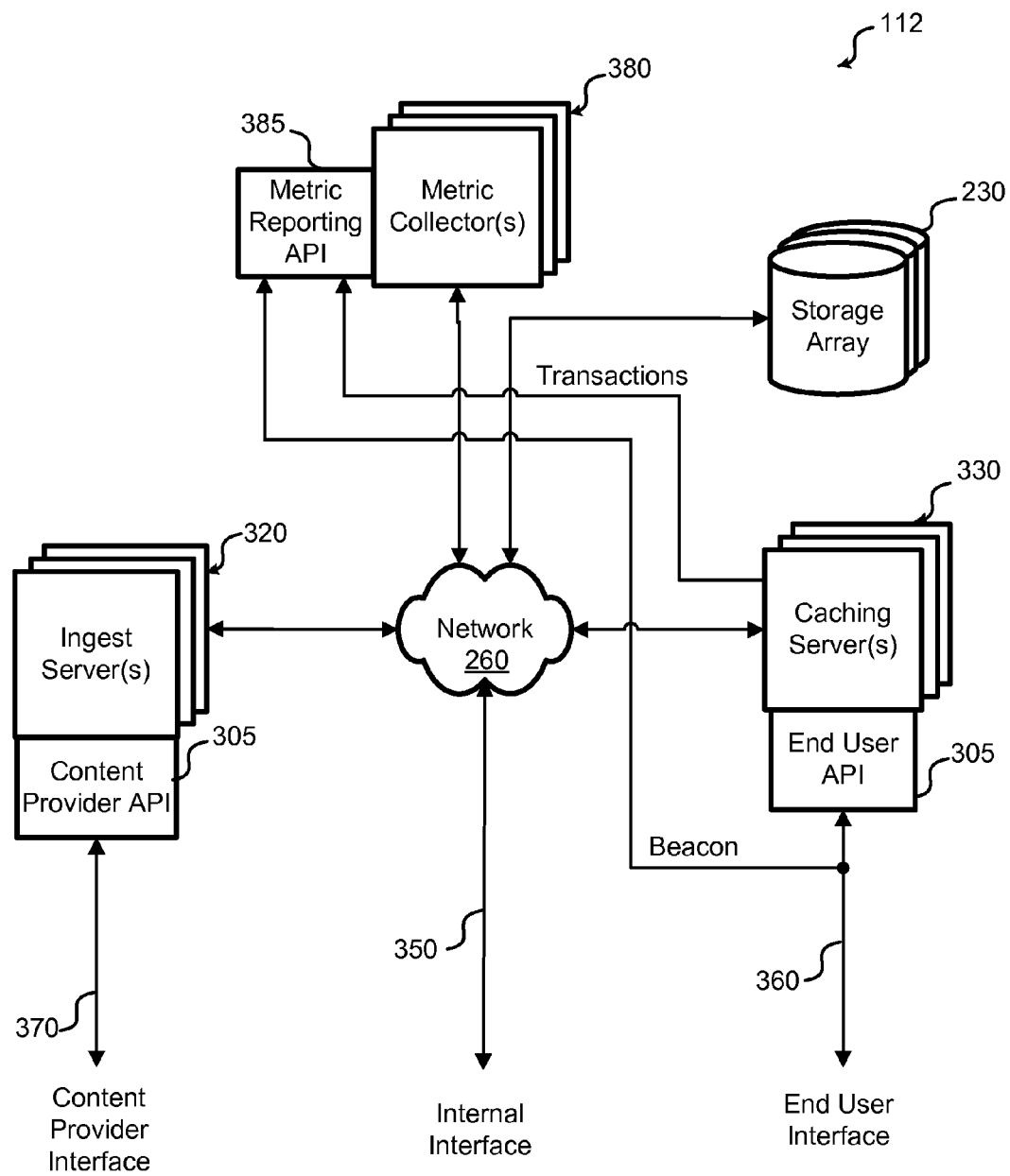
FIG. 3 depicts a block diagram of an embodiment of an application center.

With reference to FIG. 3, a block diagram illustrating an embodiment of an application center 112 is shown. The application center 112 includes a caching server(s) 330, a storage array 230, an ingest server(s) 320, and a metric collector(s) 380 that are all interconnected by a network 260. The storage array 230 retains and distributes data objects of media assets requested by end user devices 140 through end user interface 360 that connects to an end user application program interface (API) 305. The end user interface 360 also is used to reach a metric reporting API 385 to record beacon messages that contain performance information from an end user device or program. When the end user device 140 interacts with the caching server(s) 330, transaction information is reported to the metric reporting API 385 internal to the application center 112.

The beacon messages are a snapshot of how the end user device 140 is operating (e.g., currently playing, paused, ad playing, point within playback, etc.) or interaction with the application center 112. For example, an advertizing engine could report playback or clickthroughs of the ad using a beacon or transaction message. The frequency of reporting beacon messages is programmable (e.g., one, two, three, four, etc. each second; or, one every two, five, ten, etc. seconds). Some beacon messages are sent when a state changes or a threshold is triggered by the end user device (e.g., activation of a feature in the player, completing playback, viewing an advertisement, etc.). Beacon messages may also come from other parties such as a CDN 150, an origin server, an Internet service provider (ISP), geolocation services, and/or any other party involved in delivering content.

Each beacon or transaction message includes a globally unique identifier (GUID) to identify the end user device 140 individually to the media servicing system 100. The beacon message may be a periodic report from the end user device 140 or a query for status from the end user device 140. The beacon message has any number of fields to hold values related to a site visit or transaction or metrics from an end user device 140. For example, the visit beacon message has 25-30 fields and the metric beacon message has about ten fields. The beacon messages are gathered by application, customer and/or any other grouping.

With beacon and transaction information, the metric collectors 308 in each application center 112 gather performance for logging and reporting. Depending on what reports and queries users of the performance information desire, the metric gathering functions on the caching server 330 and software on the end user device 140 can be modified to provide the desired information at the desired granularity. The software on the end user device 140 can be a content player, a download manager, an operating system, or any other software that interacts with CHIMPS 110, a content provider 130 or a CDN 150.

Caching server(s) 330 and storage array 230 can also be used to collect, process, and/or store metrics information from beaconing data, media chunk requests, and/or other data sources, including data collected through end user interface 360. The application center 112 can further include ingest server(s) 320 for ingesting uploaded media assets from a content provider 130 using a content provider API 305 accessible through a content provider interface 370. The media assets may be stored on the storage array 230. The application center 112 further includes an internal interface 350, providing a communication link from the application center 112 to the rest of CHIMPS 110. It is through internal interface 350, for example, that media assets stored on storage array 230 can be made available to a kernel application center 111 for various services.

Figure 4:
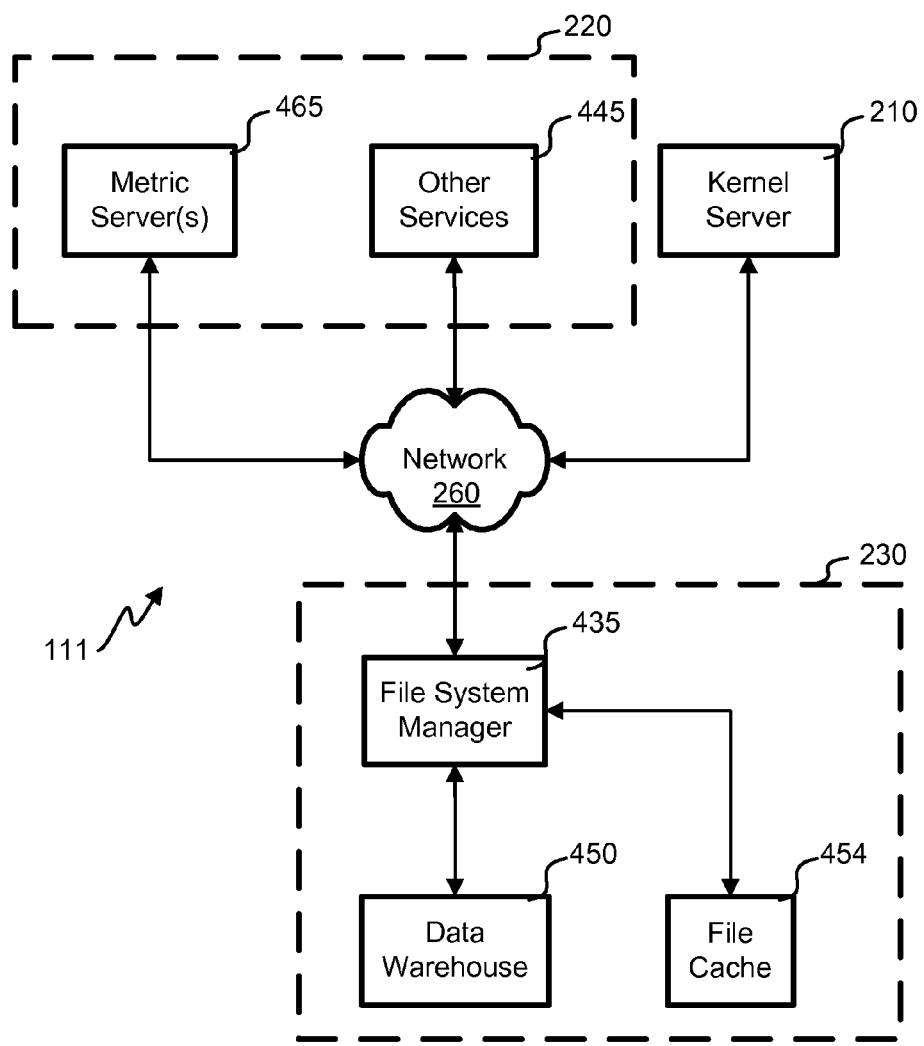
FIG. 4 depicts a block diagram of an embodiment of an embodiment of the kernel application center.

Referring next to FIG. 4, a block diagram of an embodiment of the kernel application center 111 is shown. The kernel server 210 is configured organize the workflow among services such as metric server 465, file system manager 435, and other services 445 (e.g., transcoding, origin serving, etc.). Upon triggering of particular event, the kernel server 210 is configured to notify the relevant services of the event, causing the services to process tasks associated with the event. Under the guidance of the kernel server 210, file transfers, transcoding, caching, metric processing, etc. is performed within CHIMPS 110.

The storage array 230 may include tape, spinning magnetic or optical disks, solid state drives, or other non-volatile media for storing information. Logically, the storage array 230 includes a file system manager 435, a file cache 454 and a data warehouse 450. Metric report data structures, aggregated metric result sets, content files and other information are stored in the storage array 230. In some cases, metric report data structure and aggregated metric result sets could be stored in different parts of the storage array 230. Some embodiments may store aggregated metric reports in a solid state drive portion of the storage array 230 to allow quick retrieval and place metric report data structures into slower tape and spinning media, or vice versa. The storage array 230 can also cache data objects, media assets, metric report data structures, aggregated metric result sets, etc. in the file cache 454.

The reporting of a metric record from an application center 112, provides an example of how the kernel server 210 may coordinate workflow. For instance, in response to the metric record file being updated at the application center 112, the metric collector 308 notifies the kernel server 210 that a metric record file has been saved at the application center 112. The kernel server 210 informs the file system manager 435 of the metric record file, and the file system manager 435 moves the metric record file from the application center 112 to the data warehouse 450 and notifies the kernel server 210 of the move being completed, a copy of which may also be passed to the file cache 454. In response, the kernel server 210 notifies the metric server 465 that the metric record file is now stored in the data warehouse 450. The metric server 465 processes the metric record file under command by the kernel server 210 to combine it with other metric record files from other application centers 112 to create an aggregated result set. The aggregated result set file is stored in a directory structure organized by application, customer, context, and/or some other scheme.

The modular nature of the CHIMPS 110 enables all tasks associated with an event to be completed quickly. Workflow relating to a particular event, such as moving a number of a metric record files, can be spread among the various processing servers 220 simultaneously and/or sequentially. For example, a number of metric servers 465 could be instantiated in the processing servers 220 to scale processing as desired. Moreover, because the system's modularity enables it to be scaled to accommodate differing hardware capacities, and because the CHIMPS 110 can be configured to dynamically allocate hardware to different services according to the needs of the CHIMPS 110, the speed of completing tasks relating to a particular event or series of events can further be increased. For example, a server of the CHIMPS 110 can be configured to dynamically switch its purpose based on external conditions such as load and overall system performance, providing functions such as file caching, upload, metrics collection, metric report generation, application web service, and more, on an as-needed basis.

The metric server(s) 465 processes all the metric records from the application centers 112, which have collected raw metric messages to produce the metric records. The metric records are collected in a data structure stored in a file, which is passed from the application center 112 to the kernel application center 111. For a particular customer of CHIMPS 110, domain, channel, and/or application, metric information can be gathered from any number of application centers 112. The metric server 465 further reduces the records into one or more aggregated result sets according to a scheme that optionally summarizes relevant information for the customer that receives the reports. The scheme may remove information or summarize it in some way. The one or more aggregated result sets are used to support the one or more queries that might be received or otherwise formulated by the particular customer to generate report data structures. By knowing what information is used to support various queries, the application on the end user device 140, the schemes defining reduction on the metric collectors 308 and the reduction by the metric server 465 can all be modified to successively summarize information before it is sent elsewhere according to schemes at each point that the information is summarized. Modification of the schemes can be manual or automatic in various embodiments.

The metric server(s) 465 also accommodates queries against one or more aggregated result set(s) stored in the data warehouse 450 and/or file cache 454. Metric information in aggregated result sets and report data structures may be retained for any time period according to the particular customer's need. For example, metric records maybe passed from the application centers 112 to the metric server 465 every minute, for example, to keep the queries within a minute or two of real time, but other embodiments could pass metric records each 10 seconds, 30 seconds, 45 seconds, two minutes, 5 minutes, 10 minutes, 30 minutes, hour, etc. Upon receipt of the metric record or at a given interval, the metric server 465 combines the metric record into one or more aggregated result sets with or without reduction or summarization. The aggregated result sets could accumulate metric records over a given period, for example, the last half hour, hour, day, week, month, 6 months, year, etc. Retention of the aggregated result sets and/or report data structures could be for a month, quarter, six months, year, two years, or five years, for example.

In one specific example, raw performance information messages are sent data every second, but other embodiments could send performance information messages more or less frequently (e.g., 250 ms, 500 ms, 2 s, 5 s, 10 s, 30 s, 1 min, etc.). The performance information messages can include interaction information and/or metrics. After processing the performance information messages into metric records, the metric records are passed from the metric collectors 308 each minute to the metric server(s) 465. The metric server(s) 465 combine multiple metric records into an aggregated result set. In this example, a query to the metric server 465 can interrogate one or more aggregated result set(s) from the last day of record information, which is no more than a minute old. Queries to the aggregated result sets take seconds to fulfill with a report data structure.

Figure 5A:
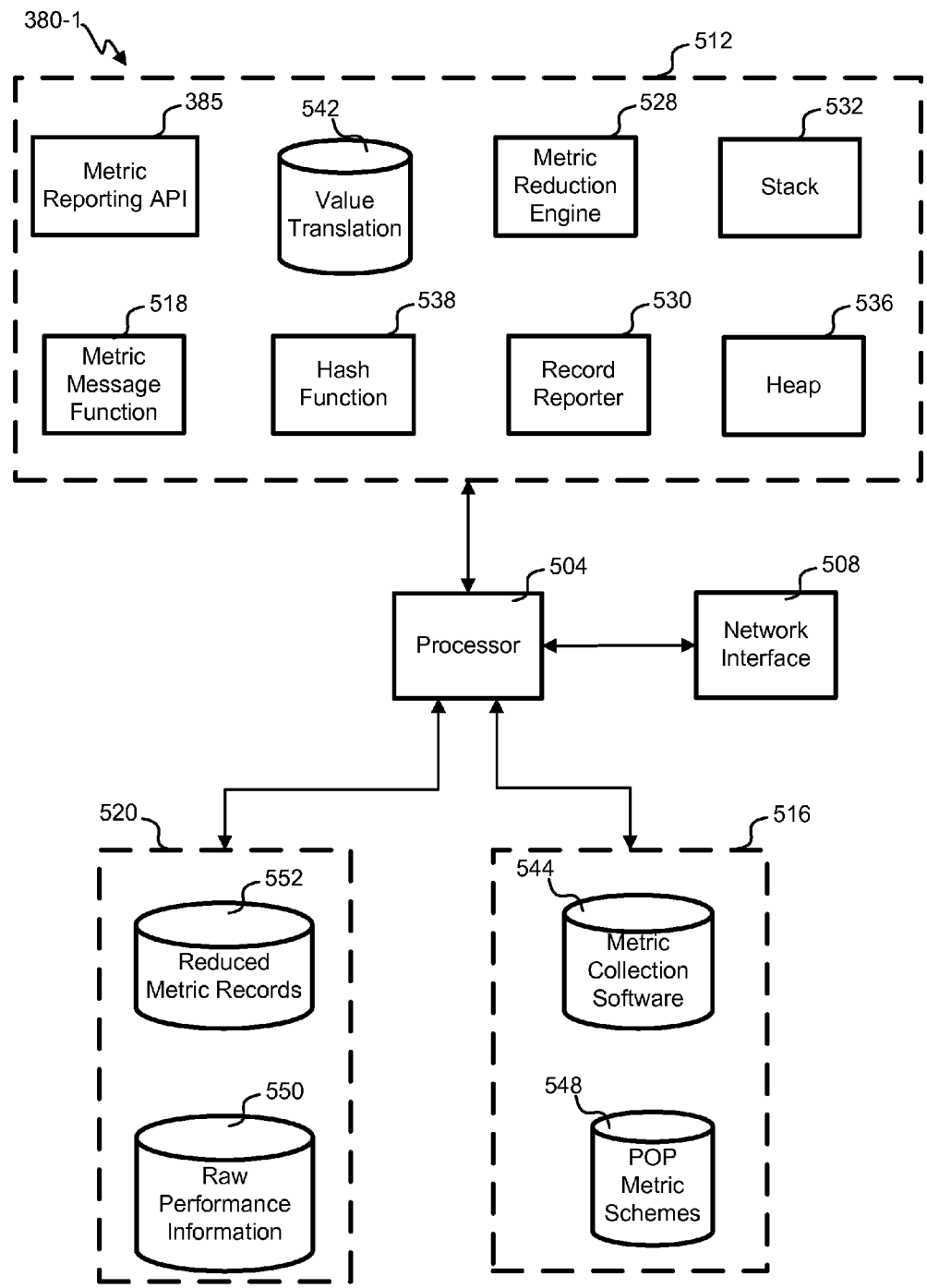
FIGS. 5A and 5B depict block diagrams of embodiments of a metric collector.

With reference to FIG. 5A, an embodiment of a metric collector 380-1 is shown. The metric collector 380 is a hardware server and/or multiple software server instantiations and may be one of many more metric collectors 380 in an application center 112. Different metric collectors 380 could be assigned to different customers, domains, channels, and/or application. A given metric collector 380 could gather performance information and compile records for a number of customers for any number of players, browsers, applets, etc. In some cases, record collection for a particular customer could be spread among a number of metric collectors 380 in a given application center 112. A farm of hardware servers could be assigned to the task of metric collection dynamically as load scales up and down in a given application center 112.

This embodiment of the metric collector 380 uses a solid state drive 520, a spinning hard drive 516, volatile solid state memory 512, a network interface 508, and a processor 504. The network interface 508 communicates with a local area network 260 that is coupled with the Internet 120 or other wide area network (WAN). The processor 504 could be any processor or microcontroller used in a hardware server. The solid state drive 520 is generally faster to access than the spinning hard drive 516 and could have a PCI, SAS, SCSI, USB, Firewire, or SATA interface. Various things can be stored in either non-volatile drive 516, 520. In some cases, a file is retrieved from the spinning hard drive 516 for faster manipulation on the solid state drive 520 before the file is returned to the spinning hard drive 516.

In this example, the spinning hard drive 516 stores metric collection software 544, POP metric schemes 548 and other software. The metric collection software 544 is loaded into solid state memory 512 upon execution. For a given customer, domain, channel, and/or application that is supported, there is a POP metric scheme 548. The relevant POP metric scheme 548 for a given situation is used to determine how to summarize beacon and transaction performance information received as metric messages. In some cases, no summarization is performed and the raw performance information 550 is just added to the reduced metric record 552.

The solid state drive 520 is used when actively processing or summarizing raw performance information 550 in this embodiment. The beacon, interaction and transaction messages are gathered as raw performance information 550. Table I shows an example of what might be gathered from a supported customer's video player from beacon messages as raw performance information 550. Other examples could gather transaction messages from a cache or host delivering content or redirection of a request for content. The content players are tracked by GUID such that each row in Table I corresponds with a beacon message received from any number of content players. An object field indicates the content object that is being played. Various other events and values are included in beacon messages that will eventually be grouped to query against. Other examples of performance information could show interaction or transaction messages tabulated according to visit identifiers (VID).

TABLE I

| Raw Performance Information | | | | | | | |
|---|---|---|---|---|---|---|---|
| GUID | Object | Version | City | Event | Time | ... | Start |
| 25 | acme.com/HD/foo.mov | 56 | Denver | end | 12:20 | ... | 12:30 |
| 14 | umedia.com/intro.aav | 32 | Tempe | stop | 87:10 | ... | 12:14 |
| 97 | shomes.org/clips/home.aac | 32 | Washington | FF | 29:20 | ... | 12:22 |
| 25 | ssdinfo.au/opener.mpeg | 12 | Denver | play | 12:21 | ... | 12:35 |
| 14 | umedia.com/intro.aav | 32 | Tempe | play | 87:10 | ... | 12:14 |
| 77 | lowis_d.eu/home/d.wma | 12 | San Diego | begin | 00:01 | ... | 08:55 |
| 97 | shomes.org/clips/home.aac | 09 | Washington | end | 30:00 | ... | 12:22 |
| 25 | ssdinfo.au/opener.mpeg | 12 | Denver | play | 12:22 | ... | 12:35 |

As an example, GUID fourteen is playing object retrievable at URI http://umedia.com/intro.aav and reported beacon information in Table I twice. In the first beacon message, the player version is thirty-two, the city of the playback is Denver, the most recent event is stop, the playback time is eighty-seven minutes and ten seconds, . . . , and the time playback started is fourteen minutes after noon. The various events and values are defined by a scheme used by the video player to know what metrics to gather and how to process them before they are reported. An event could be that the viewer paused, stopped, resumed, fast-forwarded, rewinded, ended playback, watched a commercial, clicked the mouse, or in some other way interacted with the media player; could be an error or problem encountered such as that the stream stalled, there were errors in the stream; or could reflect other status information. Values can be any string of information or integer, for example, location, player version, codec used, browser version, operating system, authentication information, authorization information, login, password, etc.

Solid state memory (e.g., random access memory) 512 holds data and software code that the processor 504 uses to perform the functions of the metric collector 380. Beacon and transaction messages are received by the metric reporting API 385 to pass performance information from the content players, host servers, caches, etc. to the metric message function 518. The received performances information is processed and placed into a data structure or file in the raw performance information store 550 by the metric message function 518. The raw performance information 550 includes reference types such as strings. In one embodiment, one hardware server hosting a metric collector 308 can process millions of beacon and transaction messages per second.

A metric reduction engine 528 summarizes the raw performance information 550 and stores metric records 552 in the solid state drive 520. The raw performance information 550 includes both reference types and value types in this embodiment. The metric reduction engine 528 converts reference types to value types when creating the reduced metric records 552. The value types are integers that can be manipulated with a stack 532 instead of the heap 536, which is used for reference types. The heap is very flexible, but is slow when compared to the stack 532.

Conversion of reference types to value types can be done in several ways for those fields of the raw performance information 550 that are not already value types by the metric reduction engine 528. Where there is a manageable and defined number of choices for a particular field, they are each assigned a value type. For example, one field is the time of day that the content started playback down to a minute resolution gives 1440 choices so the value type is an integer between 0 and 1440 is used to represent how many minutes into the day playback started.

Where there are a large number of choices for a field, a hash function 538 is passed the string or other reference type by the metric reduction engine 528 to produce a hash that serves as the value type. For example, the string umedia.com/intro.aav reference type could be hashed to produce a value type of 97F3h. One embodiment uses 64 bit hash of the string using .NET™ get hash code function, but other embodiments could use other one-way functions. Table II gives an example of value translations 542 such that each value type can be translated to/from its equivalent reference type. As more reference types are encountered that have no corresponding value type, Table II grows to accommodate new entries. Other embodiments assign a value type sequentially as new reference types are encountered. The value translations 542 are sent periodically to other parts of the CHIMPS 110 to allow for conversion of the value types to/from reference types.

TABLE II

Value Translation

| Reference | Value |
|---|---|
| acme.com/HD/foo.mov | A96D |
| umedia.com/intro.aav | 97F3 |
| shomes.org/clips/home.aac | 345D |
| ssdinfo.au/opener.mpeg | F06D |
| lowis_d.eu/home/d.wma | 90F0 |

Other embodiments can translate all the reference types prior to storing performance information from messages as raw performance information 550 in the solid state drive 520. Table III is an example of the information from Table I where all the reference types are converted to value types. Some information is already a value type either because it was an integer or the performance information in the message can be converted to value types prior to sending to the metric reporting API 385.

TABLE III

Raw Beacon and Transaction Performance Values

| VID | Object | Version | City | Event | Time | ... | Start |
|---|---|---|---|---|---|---|---|
| 25 | A96D | 56 | A56 | 0E | 0740 | ... | 0750 |
| 14 | 97F3 | 32 | 001 | 02 | 5230 | ... | 0734 |
| 97 | 345D | 32 | 149 | 13 | 1760 | ... | 0742 |
| 25 | A96D | 12 | A56 | 01 | 0741 | ... | 0755 |
| 14 | 97F3 | 32 | 001 | 01 | 5230 | ... | 0734 |

TABLE III-continued

Raw Beacon and Transaction Performance Values

| VID | Object | Version | City | Event | Time | ... | Start |
|---|---|---|---|---|---|---|---|
| 77 | A96D | 12 | 7F9 | A1 | 0001 | ... | 0535 |
| 97 | A96D | 09 | 149 | 0E | 1800 | ... | 0742 |
| 25 | 97F3 | 12 | A56 | 01 | 0742 | ... | 0755 |

After conversion of the performance information to value types, the metric reduction engine 528 summarizes messages as reduced metric records 552 according to any relevant POP metric scheme 548. In some cases, the customer, domain, channel, and/or application has no metric scheme 548 associated with it so summarization only includes reference to value translation. Generally, the raw performance information 550 is summarized through the value translation and application of metric schemes, but no so much so as to not allow the expected queries later in the process. A metric record could have the number of times a viewer paused playback, average time viewers played a particular media object, the total number of views of a particular media object, total number of a particular ad that was delivered, etc. For example, three hundred beacon messages reporting a piece of content is playing can be reduced to a reduced metric record 552 that the end user played the piece of content for five minutes.

TABLE IV

Record Accumulation

| Record | VID | Object | Value 1 | Value 2 | Value 3 | ... | Value x |
|---|---|---|---|---|---|---|---|
| 01 | 25 | A96D | 22 | 78B9 | 0 | ... | 90 |
| 02 | 14 | 97F3 | 32 | 893C | 1 | ... | 11 |
| 03 | 97 | 345D | 12 | 1600 | 1 | ... | 21 |
| 04 | 25 | A96D | 32 | 7895 | 0 | ... | 00 |
| 05 | 14 | 97F3 | 22 | A9A5 | 0 | ... | FF |
| 06 | 77 | A96D | 76 | 9F64 | 0 | ... | A9 |
| ... | ... | ... | ... | ... | ... | ... | ... |
| m | 25 | A96D | 67 | 1212 | 0 | ... | F1 |

Referring to Table IV, an example of record accumulation is shown. In this embodiment, there are m records. Each record summarizes performance information by a viewer with a media object. There are x values that describe various attributes, events, etc. relating to the VID of the viewer. The reduced metric records have their reference types converted to value types to allow manipulation in the stack 532 by avoiding the heap 536.

The metric reduction engine 528 could periodically perform the raw performance information 550 reduction, wait for a number of messages to be received, or could reduce the messages in real time as they are received. There could be a number of POP metric schemes 548 that define how the metric reduction engine 528 would summarize the raw performance information 550 as different reduced metric records in some embodiments. For example, beacon messages from a player could have a first metric scheme 548 for creating a first metric record 552 for usage of the application by many end users and a second metric scheme 548 for creating as second metric record 552 for usage of a channel by end users. Upon request or according to a schedule, a record reporter 530 passes reduced metric records 552 from the application center 112 to the kernel application center 111. The metric reduction processing operates on value types and uses the stack 532 to avoid use of the heap 536.

Figure 5B:
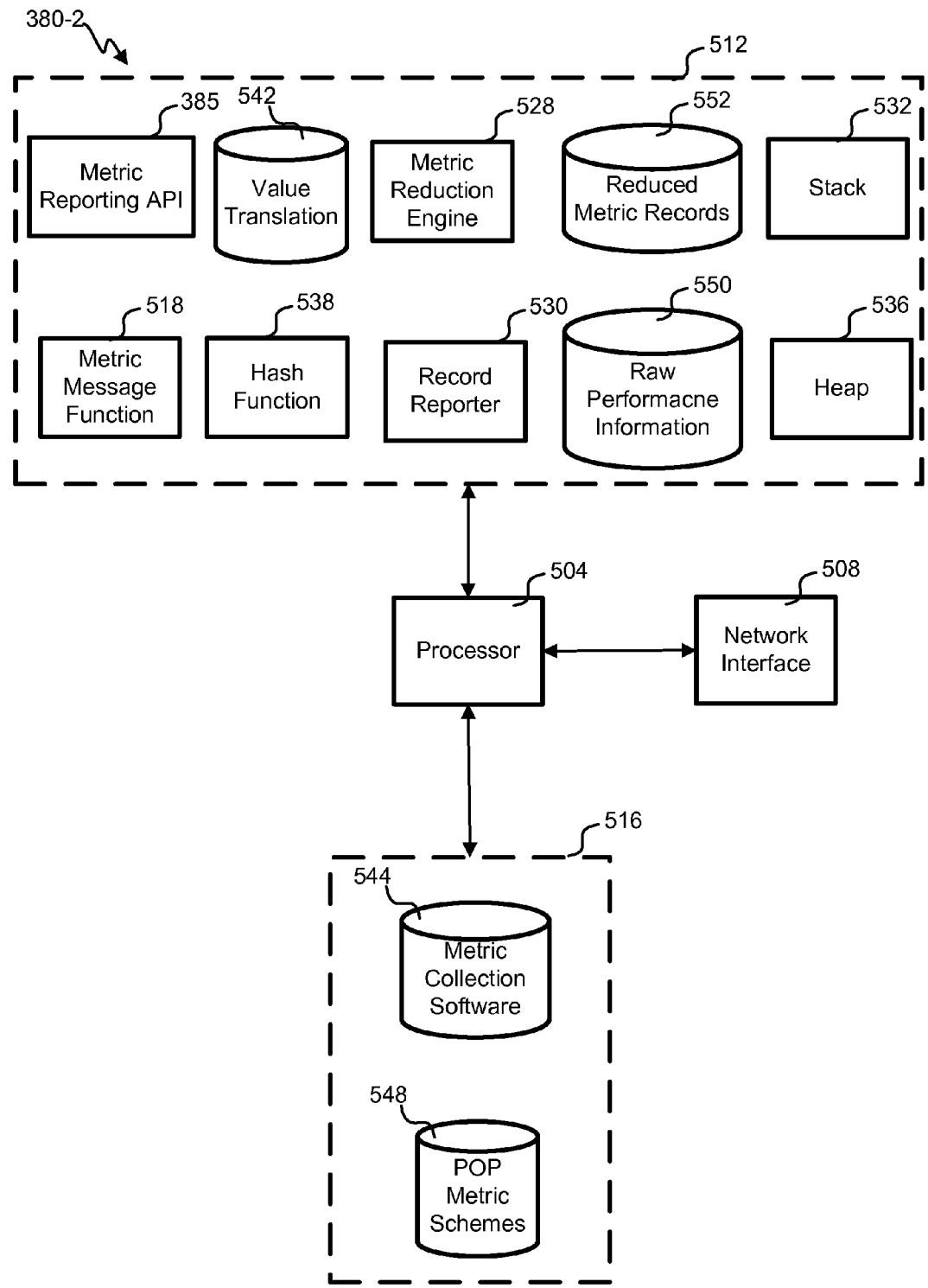

Referring next to FIG. 5B, another embodiment of a metric collector 380-2 is shown. Unlike the embodiment of FIG. 5A, this embodiment of the metric collector 380-2 places the reduced metric records 552 and raw performance information 550 in memory. Both embodiments avoid use of rotating media when operating on the reduced metric records 552 and raw performance information 550 by the metric reduction engine 528.

Figure 6A:
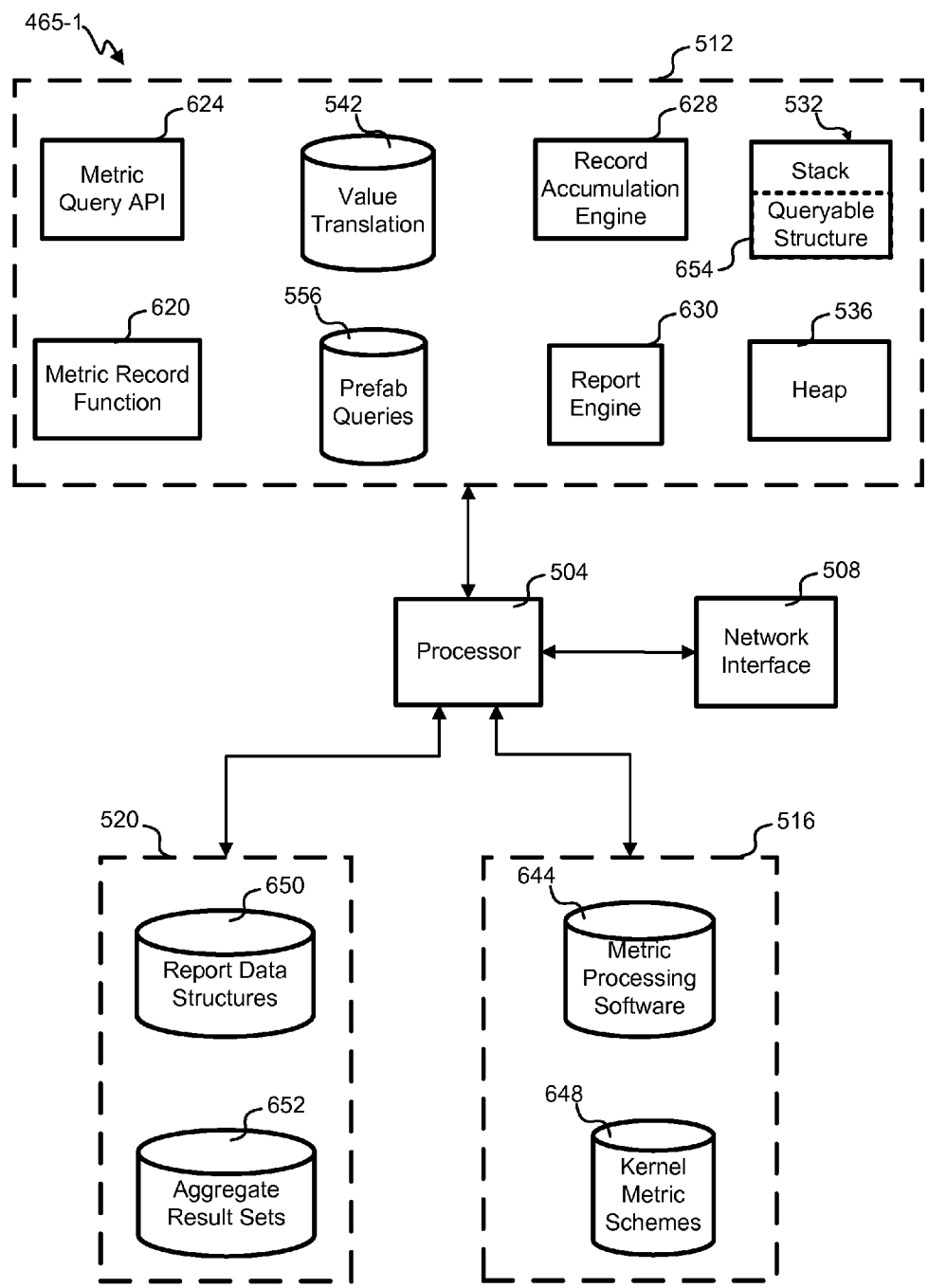
FIGS. 6A and 6B depict block diagrams of embodiments of a metric server.

With reference FIG. 6A, an embodiment of a metric server 465-1 is shown that accumulates metric records from the application centers 112 into aggregate result sets 652 with the kernel application center 111 and supports queries for reports. The metric server 465 is a hardware server with a processor 504, a network interface 508, a solid state memory 512, a solid state drive 520, and a rotating disk drive 516. This embodiment has a solid state drive 520 that holds report data structures 650 and aggregate result sets 652. A rotating disk holds metric processing software 644 and kernel metric schemes 648. Solid state memory 512 holds a metric query API 624, a metric record function 620, a record accumulation engine 628, a report engine 630, a stack 532, and a heap 536.

Generally, the access to the rotating disk drives 516 is slower than other forms of memory 512, 520. The metric processing software 644 is stored in the rotating disk drive 516 before being loaded into solid state memory 512 to provide code for the metric query API 624, the metric record function 620, the record accumulation engine 628, and the report query engine 630. Some embodiments could use rotating disk drives to the aggregate result sets 652 and report data structures 650 instead of solid state drives 520.

The kernel metric schemes 648 are stored to define what metric record information 552 received from the various POPs goes into the aggregated result sets 652. Under the control of the metric record function 620, the aggregated result sets 652 summarize metric record information 552 from the POPs to support the report queries, with optional summarization according to the kernel metric schemes 648. The aggregate result sets 652 are optimized for quick query access through use of value types and solid state drives 520.

Using the metric record function 620, all the application centers 112 pass the metric records 552 to the kernel application center 111 for retention in the aggregate result sets 652 stored in the solid state drive 520. The record accumulation engine 628 takes the aggregated result sets 652 and loads a subset of aggregated result sets 652 into a queryable structure 654 in the stack 532. As received by the metric query API 624, queries are run against the queryable structure 654 to create one or more report data structures 520 that are returned by the report engine 630 in response to the query. The query defines how to reduce one or more aggregate result sets 652 by removing/combining column(s) and removing/combining rows in the queryable structure by the report engine 630. The queryable structure is not a database in a traditional sense and the query causes all rows and/or columns of the queryable structure being processed to create a report data structure 650.

For example, the aggregated result set 652 for content players for the foo.org channel is loaded into the queryable structure 654 by the record accumulation engine 628 to find the VIDs in Denver that used the channel in the last day. Each row queryable structure 654 would be processed with the report engine to find VIDs corresponding to Denver in the relevant time period. With the information being value types within the stack 532, processing of the query is far faster than a database query. A report data structure 650 is returned with the answer to the query using the metric query API 624. If any information that was converted to a value type is requested in the query, the value translation store 542 is referenced by the report engine 630 to convert the value types to reference types.

Table IV gives an example report that is stored in the report data structures 650 before being returned to the customer through the metric query API 624. In this example, value types are converted back to their corresponding reference types using the value translations 542 accumulated throughout the CHIMPS 110. The value translations 542 are reconciled within CHIMPS 110 as newly encountered reference types are converted to value types. There could be any number of different reports generated from different fields in the queryable structure 654 to accommodate any query. In some cases, the report data structures 650 are provided to a customer according to a schedule without requiring a query or when new aggregate result sets 652 is gathered. In any event, the gathered information is not placed in a database from the time it is received by CHIMPS 110 and provided to customers in report data structures 650.

TABLE IV

Report Data Structure

| Values | String |
| --- | --- |
| Country | United States |
| Amount Viewed | 360 sec |
| Object | realure.com/HD/foo.mov |
| Ads Served | 4 |
| Ads Viewed | 3 |
| VID | audrey27 |

The metric query API 628 receives requests for metric reports 650 from customers. The report engine 630 can generate a report data structure 650 by pulling information from the aggregate result set(s) 652 loaded into the queryable structure 654. The report response to the query translates any value types back to their equivalent reference type if not done already. The queries are passed to a report engine 630 for gathering. Table IV shows an example report data structure 650. The aggregate result sets 652 in this embodiment are stored in the solid state drive 520, but other embodiments could use the spinning disk drive 516. A cache can be in solid state memory 512 or elsewhere to provide quicker access to the aggregate result sets 652.

Figure 6B:
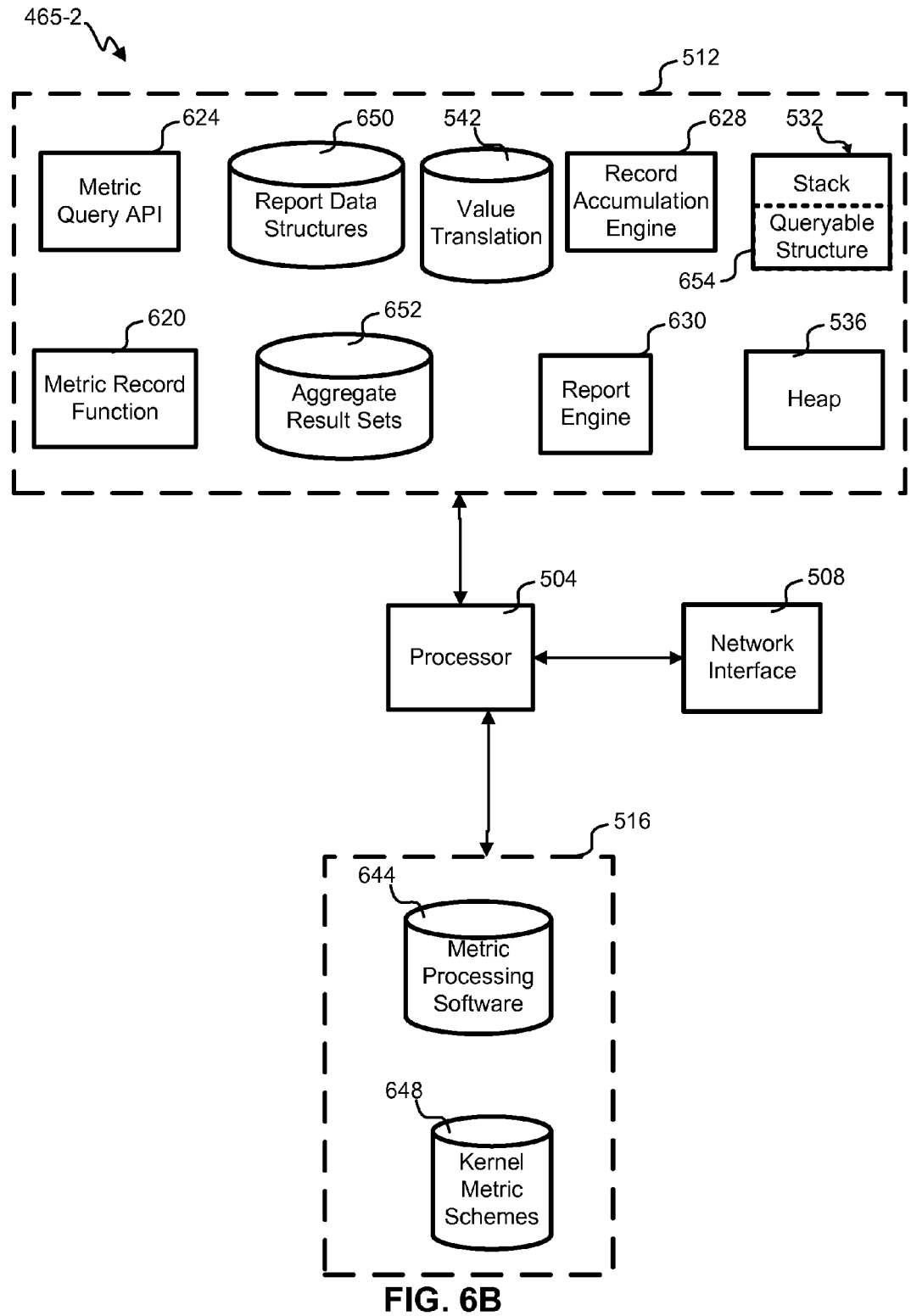

Referring next to FIG. 6B, another embodiment of a metric server 465-2 is shown that summarizes metric records from the application centers 112 into report data structures 650 at the kernel application center 111 according to report. In comparison to the embodiment of FIG. 6A, the embodiment of FIG. 6B loads the aggregate result sets 652 and report data structures 650 into solid state memory 512. Other embodiments could place one in solid state memory 512 and the other in the solid state drive 520 or the spinning hard drive 516 and vice versa. One embodiment places the aggregate result sets 652 and report data structures 650 in solid state memory 512 unless utilized beyond a threshold whereafter the solid state drive 520 is used. Cache algorithms to keep the most likely to be used in the solid state memory 512 with the less likely to be used are bumped out of the solid state drive 520.

Figure 7:
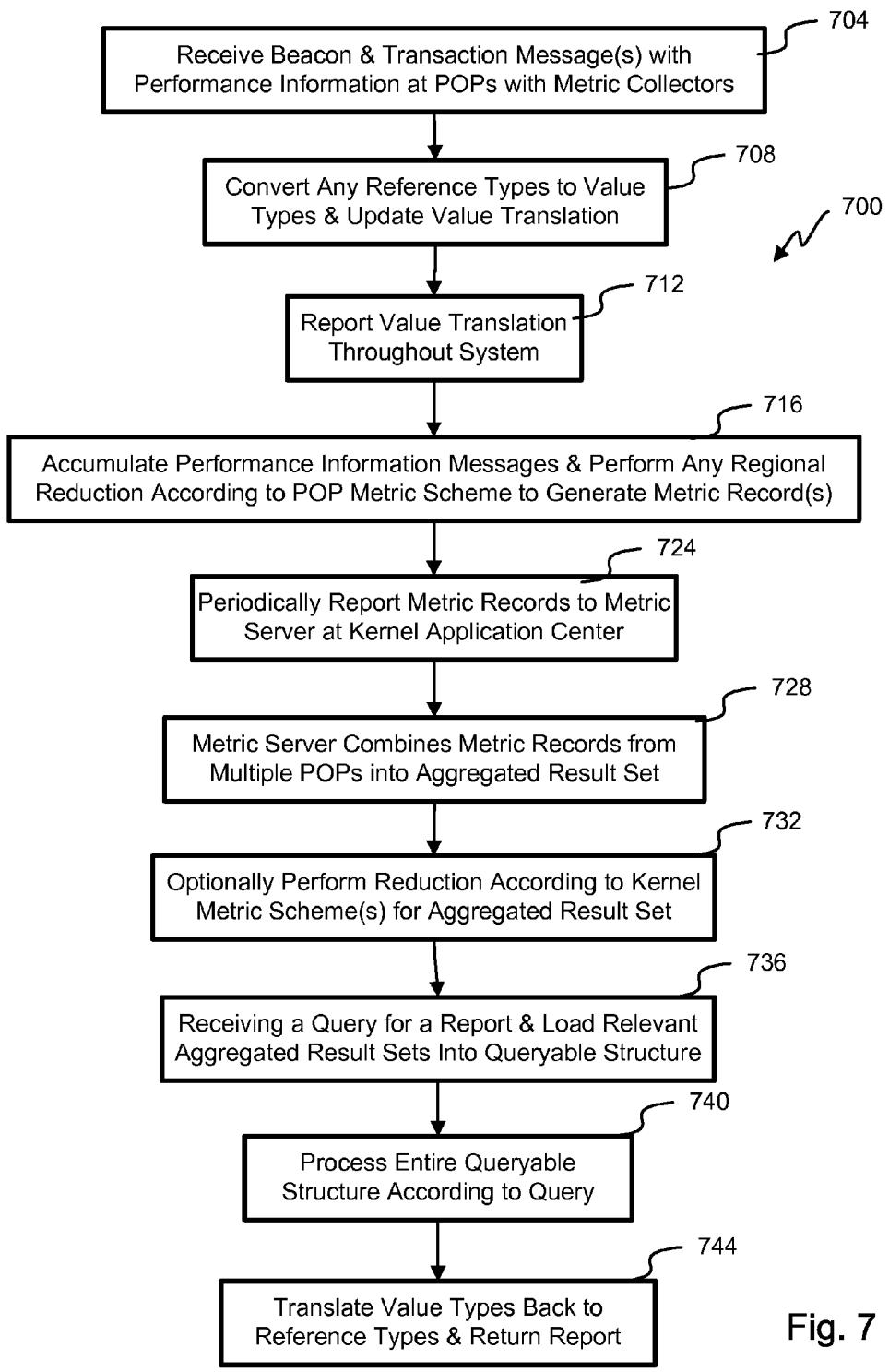
FIG. 7 illustrates a flowchart of an embodiment of a process for a two-stage reduction of metric information.

With reference to FIG. 7, an embodiment of a process 700 for a two-stage reduction of metric information. Performance information is gathered, processed and possibly summarized by players, servers, or other devices within CHIMPS 110 or across the Internet. The depicted portion of the process 700 begins in block 704 where beacon and/or transaction messages are received containing the performance information. Messages find a geographically nearby POP (in network terms) for reporting performance information to a metric collector 380 within CHIMPS 110. Anycast, DNS resolution and/or routing can be used to find a nearby POP to receive the messages. The reference types within the message are converted to value types and creating a value translation table 542 assigning new values sequentially, using a hash function 538, or some other technique in block 708 at the application center 112. Some embodiments may translate all reference types from the messages to value types, but other embodiments might convert 50%, 75%, 90%, or 95% or more of the reference types. The value translation table 542 allows looking up reference types later after processing of the value types is complete. As new value types are determined, the translation back into a reference type is distributed throughout CHIMPS 110 in block 712.

In block 716, the raw performance information 550, with reference to value type conversion, is stored in non-mechanical memory such as solid state memory (e.g., FRAM, SDRAM, core memory, RAM, etc.) or a solid state drive. Periodically, according to a schedule or as new messages are received, regional reductions are optionally done in the various application centers 112 according to a POP metric scheme 548 to generate metric records 552 in block 716. Where there is no POP metric scheme 548, performance information 550 is accumulated into metric records 552 without any reduction of the information. In this embodiment, the raw performance information 550 is loaded into the stack 532 to perform the regional processing. The metric records 552 capture and optionally summarize raw performance information 550. Periodically, the metric records from different application centers 112 are collected centrally by the metric record function 620 in the kernel application center 111 in block 724.

The metric server 465 in the kernel application center 111 combines metric records 552 from multiple application centers 112 into the aggregated result set(s) 652 in block 728. The metric record function 620 optionally applies any kernel metric schemes 648 to process the metric records 552 into aggregate result set(s) 652 in block 732. Upon a query in block 736, the record accumulation engine 628 loads aggregate result sets 652 indicated by the query into a queryable structure 654 in the stack 532. The aggregate result sets 652 are organized by customer, domain, channel, and/or application in a number of directory trees. Files or directories further divide the aggregate result sets 652 into time periods. For example, a given file may store one hour of results as a table of events or messages as rows with variables as columns. There could be a subdirectory for a day's worth of results. Any other granularity and storage scheme is possible without need for a database.

In block 740, the queryable structure 654 is processed according to the query by the report engine 630 using the stack 532. Where the query involves a number of aggregated result sets 652, for example, multiple files, they are loaded into the same queryable structure 654. Each entry in the queryable structure 654 is processed in block 740. Processing includes accumulating metrics, skipping fields, removing fields, determining relationships between fields. In block 744, the value types are translated back to reference types using the value translation lookup 542 to produce report data structures 650. The report data structure(s) 650 is returned through the metric query API 624.

Figure 8:
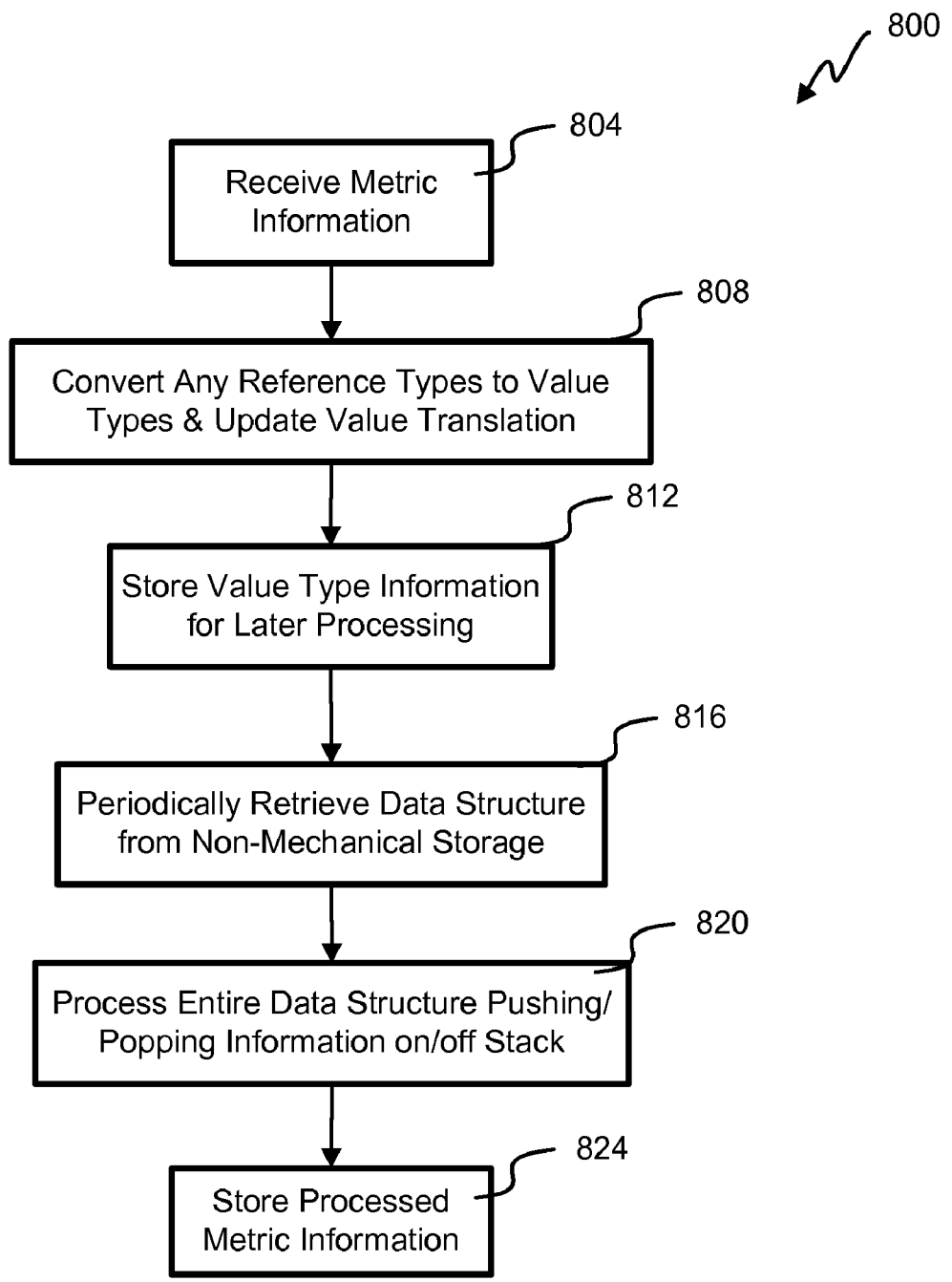
FIG. 8 illustrates a flowchart of an embodiment of a process for manipulating metric information limiting use of the heap.

Referring next to FIG. 8, a process 800 for manipulating metric information using solid state memory 512, 520 while limiting use of the heap 536 is shown. The heap 536 is substantially slower than use of the stack 532. The algorithms to summarize metric information defined by the metric schemes 548, 648 operate upon the metric information in value type form with the stack 532. Additionally, queries against the queryable structure 654 use the stack 532. In some cases, some of the metric information may remain as a reference type and use the heap, but much of the metric information is converted to value types.

The depicted portion of the process 800 begins in block 804 where metric information is received. The metric information has both value type and reference type information as received. In block 808, some of the reference types are converted to value types using a hash or sequential assignment, for example. The value translation 542 is updated. The value translation 542 is reconciled with other application centers 112 and kernel application centers 111 throughout CHIMPS 110 using a distributed database or other technique to reconcile information. In this embodiment, the application centers 112 periodically report new value translations to the kernel application centers 111 where conversion back to reference types is performed without use of a distributed database.

The converted metric information is stored in a data structure in non-mechanical memory 512, 520 in block 812. Other embodiments can use caching to move unpopular data structures to spinning disk drives 516. The data structure is not a database and can be a file with entries having a number of fields arranged in any possible way. Periodically, according to a schedule or upon receipt, the data structure or a number of data structures are retrieved in block 816. Processing according to a metric scheme 548, 648 or in response to a query are examples of processing that is performed in block 820. The processing involves loading the data structure into random access memory and processing the data structure entirely by processing it from one end to the other possibly skipping certain fields or groups of fields. The stack is used by pushing and popping value types onto and off the stack 532. In some cases, the entire data structure is pushed onto the stack 532 and popped off during processing. In block 824, the processed metric information is stored.

A number of variations and modifications of the disclosed embodiments can also be used. For example, reference types are converted to value types within the CHIMPS, but other embodiments could perform the conversion in the media player or elsewhere away from the CHIMPS. Value translation would be passed to CHIMPS to allow translation of value types back to reference types.

In some embodiments, the media player is flexible build the beacon messages according to a user scheme. New user schemes could be propagated out from the CHIMPS as queries are received for metrics not currently gathered. This could be done automatically or manually by design of a new user scheme. The user scheme could perform some or all of the processing of the performance information away from CHIMPS.

While the principles of the disclosure have been described above in connection with specific apparatuses and methods, it is to be clearly understood that this description is made only by way of example and not as limitation on the scope of the disclosure.

What is claimed is:

1. An Internet metric processing system for processing web performance metrics in a distributed fashion, the Internet metric processing system comprising:
 a first point of presence (POP) including one or more hardware servers programmed to:
  receive a first metric message, including first performance information, which relates to content delivery of media with a first end user computing device;
  receive a second metric message, including second performance information, which relates to content delivery of media with the first end user computing device;

convert at least some values from the first performance information and the second performance information from reference type to value type;
update a value translation;
perform a first regional reduction by:
accumulating the first performance information and the second performance information; and
combining the first performance information and the second performance information to generate a first metric record, which summarizes the first performance information and second performance information according to a first metric scheme; and
store the first metric record at the first POP,
a second POP including one or more hardware servers programmed to:
receive a third metric message, including third performance information, which relates to content delivery of media with a second end user computing device;
receive a fourth metric message, including fourth performance information, which relates to content delivery of media with the second end user computing device;
convert at least some values from the third performance information and the fourth performance information from reference type to value type;
update the value translation;
perform a second regional reduction by:
accumulating the third performance information and the fourth performance information; and
combining the third performance information and the fourth performance information to generate a second metric record, which summarizes the third performance information and fourth performance information according to the first metric scheme; and
store the second metric record at the second POP, and
a central location coupled to the first POP and the second POP, the central location including one or more hardware servers programmed to:
receive the first metric record from the first POP;
receive the second metric record from the second POP;
combine the first metric record and the second metric record into a result set;
perform a central reduction by summarizing the result set according to a second metric scheme;
store the summarized result set comprising a plurality of metric records including the first metric record and the second metric record, the summarized result set being a data structure held in a file;
receive a query for a report after the summarizing of the result set;
load the file holding the summarized result set;
process the summarized result set to create the report that is a subset of the summarized result set; and
send the report in response to the query.

2. The Internet metric processing system for processing web performance metrics in the distributed fashion as recited in claim 1, wherein the processing the summarized result set comprises processing all of the data structure.

3. The Internet metric processing system for processing web performance metrics in the distributed fashion as recited in claim 1, wherein the processing to create the report exchanges value types for reference types.

4. The Internet metric processing system for processing web performance metrics in the distributed fashion as recited in claim 1, wherein the result set is stored in a file in solid state memory.

5. A method for processing web performance metrics in a distributed fashion, the method comprising:
receiving a first metric message, including first performance information with a first point of presence (POP), wherein the first performance information relates to content delivery of media with a first end user computing device;
receiving a second metric message, including second performance information with the first POP, wherein the second performance information relates to content delivery of media with the first end user computing device;
converting at least some values from the first performance information and the second performance information from reference type to value type;
updating a value translation;
performing a first regional reduction by:
accumulating the first performance information and the second performance information; and
combining the first performance information and the second performance information to generate a first metric record, which summarizes the first performance information and second performance information according to a first metric scheme;
storing the first metric record at the first POP;
sending the first metric record to a location away from the first POP;
receiving a third metric message, including third performance information at a second POP, wherein the third performance information relates to content delivery of media with a second end user computing device;
receiving a fourth metric message, including fourth performance information at the second POP, wherein the fourth performance information relates to content delivery of media with the second end user computing device;
converting at least some values from the third performance information and the fourth performance information from reference type to value type;
updating the value translation;
performing a first regional reduction by:
accumulating the third performance information and the fourth performance information; and
combining the third performance information and the fourth performance information to generate a second metric record, which summarizes the third performance information and fourth performance information according to the first metric scheme;
storing the second metric record at the second POP;
sending the second metric record to the location away from at least one of the first POP or the second POP;
combining the first metric record and the second metric record at the location into a result set;
performing a central reduction by summarizing the result set according to a second metric scheme;
storing the summarized result set comprising a plurality of metric records including the first metric record and the second metric record, the summarized result set being a data structure held in a file;
receiving a query for a report after the summarizing of the result set;
loading the file holding the summarized result set;
processing the summarized result set to create the report that is a subset of the summarized result set; and
sending the report in response to the query.

6. The method for processing web performance metrics in the distributed fashion as recited in claim 5, wherein the processing the summarized result set comprises processing all of the data structure.

7. The method for processing web performance metrics in the distributed fashion as recited in claim 5, wherein the processing the summarized result set to create the report exchanges value types for reference types.

8. The method for processing web performance metrics in the distributed fashion as recited in claim 5, wherein the storing the summarized result set includes storing the result into a file in solid state memory.

9. The method for processing web performance metrics in the distributed fashion as recited in claim 5, wherein the processing the summarized result set to create the report is done without use of a database.

10. The method for processing web performance metrics in the distributed fashion as recited in claim 5, wherein the first metric message is generated within the first POP.

11. One or more non-transitory machine-readable media having machine-executable instructions configured to perform the machine-implementable method for processing web performance metrics in the distributed fashion of claim 5.

12. An Internet metric processing system for processing web performance metrics in a distributed fashion, the Internet metric processing system comprising a plurality of hardware servers programmed to:
receive a first metric message, including first performance information with a first point of presence (POP), wherein the first performance information relates to content delivery of media with a first end user computing device;
receive a second metric message, including second performance information with the first POP, wherein the second performance information relates to content delivery of media with the first end user computing device;
converting at least some values from the first performance information and the second performance information from reference type to value type;
updating a value translation;
performing a first regional reduction by:
accumulating the first performance information and the second performance information; and
combining the first performance information and the second performance information to generate a first metric record, which summarizes the first performance information and second performance information according to a first metric scheme;
store the first metric record at the first POP;
send the first metric record to a location away from the first POP;
receive a third metric message, including third performance information at a second POP, wherein the third performance information relates to content delivery of media with a second end user computing device;
receive a fourth metric message, including fourth performance information at the second POP, wherein the fourth performance information relates to content delivery of media with the second end user computing device;
converting at least some values from the third performance information and the fourth performance information from reference type to value type;
updating the value translation;
performing a first regional reduction by:
accumulating the third performance information and the fourth performance information; and
combining the third performance information and the fourth performance information to generate a second metric record, which summarizes the third performance information and fourth performance information according to the first metric scheme;
store the second metric record at the second POP;
send the second metric record to the location away from at least one of the first POP or the second POP;
combine the first metric record and the second metric record at the location into a result set;
perform a central reduction by summarizing the result set according to a second metric scheme;
store the summarized result set comprising a plurality of metric records including the first metric record and the second metric record, the result summarized set being a data structure held in a file;
receive a query for a report after the summarizing of the result set;
load the file holding the summarized result set;
process the summarized result set to create the report that is a subset of the summarized result set; and
send the report in response to the query.

13. The Internet metric processing system for processing web performance metrics in the distributed fashion as recited in claim 12, the plurality of hardware servers further programmed to process the summarized result set from all of the data structure without program jumps.

14. The Internet metric processing system for processing web performance metrics in the distributed fashion as recited in claim 12, the plurality of hardware servers further programmed to process the summarized result set to create the report without use of a database.

* * * * *